United States Patent
Tiefensee et al.

(10) Patent No.: US 10,874,105 B2
(45) Date of Patent: Dec. 29, 2020

(54) EMULSIFIABLE CONCENTRATE COMPRISING TRIAZOLE FUNGICIDE, FATTY ACID AMIDE AND AROMATIC HYDROCARBON

(71) Applicant: BASF SE, Ludwigshafen am Rhein (DE)

(72) Inventors: Kristin Tiefensee, Bad Duerkheim (DE); Benjamin Schaefer, Hassloch (DE)

(73) Assignee: BASF SE, Ludwigshafen am Rhein (DE)

( * ) Notice: Subject to any disclaimer, the term of this patent is extended or adjusted under 35 U.S.C. 154(b) by 35 days.

(21) Appl. No.: 15/747,544

(22) PCT Filed: Jul. 25, 2016

(86) PCT No.: PCT/EP2016/067646
§ 371 (c)(1),
(2) Date: Jan. 25, 2018

(87) PCT Pub. No.: WO2017/017055
PCT Pub. Date: Feb. 2, 2017

(65) Prior Publication Data
US 2018/0368405 A1    Dec. 27, 2018

(30) Foreign Application Priority Data
Jul. 27, 2015 (EP) ..................... 15178490

(51) Int. Cl.
*A01N 43/653*    (2006.01)
*A01N 25/04*    (2006.01)

(52) U.S. Cl.
CPC .......... *A01N 43/653* (2013.01); *A01N 25/04* (2013.01)

(58) Field of Classification Search
CPC .................................... A01N 43/653
See application file for complete search history.

(56) References Cited

U.S. PATENT DOCUMENTS

| | | |
|---|---|---|
| 2013/0065759 A1 | 3/2013 | Narayanan |
| 2014/0371075 A1 | 12/2014 | Dieleman et al. |

FOREIGN PATENT DOCUMENTS

| | | |
|---|---|---|
| WO | 2013149925 A1 | 10/2013 |
| WO | 2014139805 A1 | 9/2014 |
| WO | 2014154447 A1 | 10/2014 |

OTHER PUBLICATIONS

European Search Report for EP Patent Application No. 15178490.7, Completed on Oct. 14, 2015, 2 pages.
International Search Report and Written Opinion for International Application No. PCT/EP2016/067646, dated Sep. 5, 2016, 10 pages.

*Primary Examiner* — San Ming R Hui
(74) *Attorney, Agent, or Firm* — Armstrong Teasdale LLP

(57) ABSTRACT

Provided herein is an emulsifiable concentrate comprising a triazole fungicide, an aromatic hydrocarbon, and an amide of the formula (I) as defined herein. Further provided herein is a process for the preparation of said concentrate; an emulsion obtainable by mixing water, a triazole fungicide, an aromatic hydrocarbon, and an amide of the formula (I); and a method for controlling phytopathogenic fungi, wherein the concentrate or the emulsion is allowed to act on the phytopathogenic fungi, their environment, on the crop plants to be protected from the phytopathogenic fungi or on the soil.

12 Claims, No Drawings

EMULSIFIABLE CONCENTRATE COMPRISING TRIAZOLE FUNGICIDE, FATTY ACID AMIDE AND AROMATIC HYDROCARBON

CROSS-REFERENCE TO RELATED APPLICATIONS

This application is the national stage entry of PCT/EP2016/067646, filed on Jul. 25, 2016, which claims the benefit of priority to European Patent Application No. 15178490.7, filed Jul. 27, 2015, which are incorporated by reference in their entirety herein.

FIELD OF THE INVENTION

The present invention relates to an emulsifiable concentrate comprising a triazole fungicide, an aromatic hydrocarbon, and an amide of the formula (I) as defined herein. The invention further relates to a process for the preparation of said concentrate; an emulsion obtainable by mixing water, a triazole fungicide, an aromatic hydrocarbon, and an amide of the formula (I); and to a method for controlling phytopathogenic fungi, where the concentrate or the emulsion is allowed to act on the phytopathogenic fungi, their environment, on the crop plants to be protected from the phytopathogenic fungi or on the soil.

BACKGROUND

Emulsifiable concentrates (also referred to as EC) are widely used formulations in crop protection. EC are typically based on hydrophobic solvents with high dissolution power. Due to their hydrophobicity they typically result in stable emulsions when diluted with water.

Fatty acid amides are powerful solvents. However, they often lead to instable emulsions when their full dissolution power is needed to achieve high active concentrations. In these cases the respective active needs to be formulated as SC (suspension concentrate) or WDG (water dispersible granules). WO 2013/149925 relates to agroformulations comprising copolymer of vinyl-lactam, n-alkyl acrylamide, and alkyl (meth)acrylate. WO 2014/139805 describes emulsifiable concentrates comprising pesticide, alkyl benzoate and fatty acid amide. WO 2014/154447 relates to emulsifiable concentrates comprising pesticide, alkyl lactate and fatty amide. US 2014/371075 describes emulsifiable concentrates comprising pesticide, amide, carbonate and hydrocarbon. US 2013/065759 relates to preformed concentrates for delivery of water insoluble film forming polymers. Currently, there is no EC on the market with high active concentrations.

DESCRIPTION

Therefore, it was an object of the present invention to provide emulsifiable concentrates with high active concentrations that result in stable emulsions which are stable for more than 24 hours.

The object was achieved by an emulsifiable concentrate comprising a triazole fungicide, an aromatic hydrocarbon, and an amide of the formula (I)

$$R^1\text{—C(O)N}(R^2)_2 \quad (I)$$

where $R^1$ is $C_5$-$C_{19}$-alkyl and $R^2$ is $C_1$-$C_4$-alkyl
and optionally an emulsifier.

Usually, an emulsifiable concentrate is taken to mean compositions which form an oil-in-water emulsion upon mixing with water (e.g. in a weight ratio of 1 part concentrate to 99 parts water). The concentrate is preferably a homogeneous solution. It is usually virtually free of dispersed particles.

Aromatic hydrocarbons (a) are compounds which consist of carbon and hydrogen and which comprise aromatic groups. Preferred are aromatic hydrocarbons or their mixtures with an initial boiling point of at least 140° C., preferably at least 180° C. Examples of aromatic hydrocarbons are benzene, toluene, o-, m- or p-xylene, naphthalene, biphenyl, o- or m-terphenyl, aromatic hydrocarbons which are mono- or polysubstituted by $C_1$-$C_{20}$-alkyl, such as ethylbenzene, dodecylbenzene, tetradecylbenzene, hexadecylbenzene, methylnaphthalene, diisopropylnaphthalene, hexylnaphthalene or decylnaphthalene. Others which are suitable are aromatic hydrocarbon mixtures with an initial boiling point of at least 140° C. Such compounds are for example commercially available from ExxonMobil or BP under the following trade names: Solvesso® 100, Solvesso® 150, Solvesso® 200, Solvesso® 150ND, Solvesso® 200ND, Aromatic® 150, Aromatic® 200, Hydrosol® A 200, Hydrosol® A 230/270, Caromax® 20, Caromax® 28, Aromat® K 150, Aromat® K 200, Shellsol® A 150, Shellsol® A 100, Fin® FAS-TX 150, Fin® FAS-TX 200. Preferred aromatic hydrocarbons are aromatic hydrocarbon mixtures with an initial boiling point of at least 140° C., preferably at least 180° C., more preferably of from 140° C. to 310° C. Mixtures of the above aromatic hydrocarbons are also possible. Preferably, the emulsion according to the invention comprises from 0.5 to 20% by weight, preferably from 1 to 15% by weight, especially preferably from 1 to 10% by weight of aromatic hydrocarbon, in each case based on the total weight of the emulsifiable concentrate.

Preferred (b) amides of the formula (I) are those in which $R^1$ is $C_6$-$C_{12}$-alkyl, preferably linear, and $R^2$ is methyl. Especially preferred amides of the formula (I) are those in which $R^1$ is $C_6$-$C_{12}$-alkyl and $R^2$ is methyl. Even more preferred are those where $R^1$ is octyl and/or decyl and/or dodecyl and $R^2$ is methyl. Preferably, the emulsion according to the invention comprises from 30 to 80% by weight, preferably from 40 to 70% by weight, especially preferably from 42 to 60% by weight of amide of the formula (I), in each case based on the total weight of the emulsifiable concentrate.

Mixtures of amides of the formula (I) are also possible, for example mixtures where $R^1$ is $C_6$-$C_{12}$-alkyl and $R^2$ is methyl, preferably where $R^1$ is $C_8$-$C_{10}$-alkyl or $C_{12}$-alkyl and $R^2$ is methyl. Mixtures of amides of the formula (I) comprise in most cases two amides of the formula (I) in an amount of in each case at least 30% by weight (preferably at least 40% by weight) based on the total amount of amides of the formula (I).

The weight ratio of aromatic hydrocarbon to amide of formula (I) can be between 1:200 and 1:4, preferably between 1:20 and 1:5.

The concentrate can comprise not more than 80% by weight, preferably not more than 65% by weight and in particular not more than 60% by weight of amide of the formula (I), in each case based on the total weight of the emulsion. The concentrate can comprise at least 30% by weight, preferably at least 40% by weight and in particular at least 42% by weight of amide of the formula (I), in each case based on the total weight of the emulsifiable concentrate.

The concentrate may further comprise further solvents (e.g. the organic solvents listed below) in addition to the aromatic hydrocarbon and the amide of the formula (I). The concentrate can comprise not more than 30% by weight, preferably not more than 12% by weight and in particular not more than 7% by weight of further solvents, in each case based on the total weight of the emulsifiable concentrate.

Preferably, the concentrate is free of water. In another form, the concentrate is substantially free of water. Substantially free means that it can comprise not more than 3% by weight, preferably not more than 1% by weight and in particular, not more than 0.5% by weight of water, in each case based on the total weight of the emulsifiable concentrate. In a special form, the concentrate may comprise not more than 0.3% by weight and in particular, not more than 0.1% by weight of water, in each case based on the total weight of the emulsifiable concentrate.

In accordance with the present invention, the triazole fungicide can be selected from the group consisting of azaconazole, bitertanol, bromuconazole, cyproconazole, difenoconazole, diniconazole, diniconazole-M, epoxiconazole, fenbuconazole, fluquinconazole, flusilazol, flutriafol, hexaconazole, imibenconazole, ipconazole, metconazole, myclobutanil, oxpoconazole, paclobutrazol, penconazole, propiconazole, prothioconazole, simeconazole, tebuconazole, tetraconazole, triadimefon, triadimenol, triticonazole, uniconazole, 1-(4-chlorophenyl)-2-([1,2,4]triazol-1-yl)cycloheptanol. In preferred embodiment, the triazole fungicide in the emulsifiable concentrate of the present invention is tebuconazole.

The concentrate of the present invention comprises at least 25% by weight, preferably of from 25% to 40% by weight and in particular of from 30% to 37% by weight of triazole fungicide, preferably tebuconazole, in each case based on the total weight of the emulsifiable concentrate.

In addition to the triazole fungicide, the concentrate can comprise one or more further pesticides. The term pesticides refers to at least one active substance selected from the group of the fungicides other than triazole fungicides, insecticides, nematicides, herbicides, safeners and/or growth regulators. Preferred pesticides are fungicides other than triazole fungicides, insecticides, herbicides and growth regulators.

The further pesticide is preferably water-insoluble. Usually, it is soluble in water to not more than 1 g/l, preferably not more than 200 mg/l and in particular not more than 50 mg/l at 25° C. Using simple preliminary experiments, the skilled worker can select a pesticide with a suitable water-solubility. In an especially preferred form, the concentrate does not comprise any further pesticide.

The concentrate may comprise from 0.1 to 60% by weight, preferably from 25 to 50% by weight, in particular from 30 to 45% by weight, of triazole fungicide, the basis being the total of all the triazole fungicide and pesticides present in the concentrate.

The emulsifiable concentrate can furthermore comprise auxiliaries conventionally used for crop protection products. Suitable auxiliaries are solvents, liquid carriers, surfactants, dispersants, emulsifiers, wetters, adjuvants, solubilizers, penetrants, protective colloids, stickers, thickeners, bactericides, antifreeze agents, antifoam agents, colorants, adhesives and binders.

Suitable solvents and liquid carriers are organic solvents such as mineral oil fractions with medium to high boiling point, for example kerosene, diesel oil; oils of vegetable or animal origin; aliphatic or cyclic hydrocarbons; alcohols, for example ethanol, propanol, butanol, cyclohexanol; glycols; ketones, for example cyclohexanone; esters, for example carbonates, fatty acid esters, gamma-butyrolactone; fatty acids; phosphonates; amines; amides, for example N-methylpyrrolidone; and their mixtures.

The emulsifier in accordance with the present invention can be an anionic surfactant, a nonionic surfactant or a mixture thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetrant, protective colloid, or auxiliary. Examples of surfactants are listed in McCutcheon's, Vol. 1: Emulsifiers & Detergents, McCutcheon's Directories, Glen Rock, USA, 2008 (International Ed. or North American Ed.).

In a preferred embodiment, the emulsifier is a nonionic surfactant. Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate. Preferred nonionic surfactants are alkoxylates. Nonionic surfactants such as alkoxylates may also be employed as adjuvants.

The concentrate preferably comprises at least one nonionic surfactant as emulsifier. The concentrate usually comprises at least 1% by weight of nonionic surfactants, preferably at least 5% by weight and in particular at least 10% by weight, in each case based on the total weight of the emulsifiable concentrate. The composition can comprise from 1% to 65% by weight of nonionic surfactants, preferably from 5% to 45% by weight and in particular, not more than from 10% to 35% by weight, in each case based on the total weight of the emulsifiable concentrate.

In a preferred form, the concentrate preferably comprises at least one alkoxylate, in particular fatty acids or fatty acid esters which have been alkoxylated with 1 to 50 ethylene oxide and/or propylene oxide units. Ethylene oxide and/or propylene oxide may be employed for the alkoxylation, preferably ethylene oxide. In a preferred form, the concentrate preferably comprises at least one alkoxylated (ethoxylated) triglycerides. In a more preferred embodiment the alkoxylated fatty acid ester is ethoxylated casteroil with 30 to 45 ethylene oxide units. The concentrate usually comprises at least 2% by weight of alkoxylates, in particular an alkoxylated fatty acid esters as defined above, ethoxylated casteroil with 30 to 45 ethylene oxide units, preferably at least 7% by weight and in particular at least 10% by weight, in each case based on the total weight of the emulsifiable concentrate. Preferably, the concentrate comprises from 2% to 65% by weight of alkoxylates, in particular a fatty acid ester e.g. a triglyceride as defined above, preferably ethoxylated casteroil with 30 to 45 ethylene oxide units, preferably from 7% to 45% by weight and in particular not more than from 10% to 35% by weight, in each case based on the total weight of the emulsifiable concentrate.

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates. Preferred anionic surfactants are sulfates and sulfonates.

The concentrate preferably comprises at least one anionic surfactant as emulsifier as defined above, preferably an alkyl benzene sulfonate. The concentrate usually comprises at least 0.5% by weight of anionic surfactants, preferably at least 2% by weight, in each case based on the total weight of the emulsifiable concentrate. The composition can comprise of from 0.5% to 30% by weight of anionic surfactants, preferably from 2% to 15% by weight and in particular from 2% to 10% by weight in each case based on the total weight of the emulsifiable concentrate.

Preferably, the concentrate comprises a nonionic surfactant (such as alkoxylates as defined above) and an anionic surfactant (such as sulfates or sulfonates as defined above) as emulsifier. In a more preferred embodiment, the concentrate comprises as emulsifiers a nonionic surfactant selected from alkoxylated (ethoxylated) triglycerides, even more preferably the alkoxylated fatty acid ester is ethoxylated castoroil with 30 to 45 ethylene oxide units and an anionic surfactant, preferably alkyl benzene sulfonate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds which have negligible or even no pesticidal activity themselves, and which improve the biological performance of the compound I on the target. Examples are surfactants, mineral or vegetable oils, and other auxilaries. Further examples are listed by Knowles, Adjuvants and Additives, Agrow Reports DS256, T&F Informa UK, 2006, chapter 5.

Suitable bactericides are bronopol and isothiazolinone derivatives such as alkylisothiazolinones and benzisothiazolinones. Suitable antifreeze agents are ethylene glycol, propylene glycol, urea and glycerol. Suitable antifoam agents are silicones, long-chain alcohols, and salts of fatty acids. Suitable colorants (e.g. in red, blue, or green) are pigments which are sparingly soluble in water, and water-soluble dyes. Examples are inorganic colorants (e.g. iron oxide, titanium oxide, iron hexacyanoferrate) and organic colorants (e.g. alizarin, azo and phthalocyanine colorants).

In a preferred embodiment, the invention relates to an emulsifiable concentrate comprising 30 to 40% by weight of a triazole fungicide, preferably tebuconazole, 2 to 10% by weight of an aromatic hydrocarbon, preferably and 40 to 60% by weight of an amide of the formula (I)

$$R^1-C(O)N(R^2)_2 \quad (I)$$

where $R^1$ is $C_5$-$C_{19}$-alkyl and $R^2$ is $C_1$-$C_4$-alkyl, preferably $R^1$ is $C_8$-$C_{10}$-alkyl or $C_{12}$-alkyl and $R^2$ is $C_1$-alkyl and optionally 1 to 12% by weight of an emulsifier, based on the total weight of the emulsifiable concentrate.

In another preferred embodiment, the invention relates to an emulsifiable concentrate comprising 30 to 40% by weight of a triazole fungicide, preferably tebuconazole, 2 to 10% by weight of an aromatic hydrocarbon, 10 to 16% by weight of a nonionic surfactant, fatty acids and/or fatty acid esters which have been alkoxylated with 1 to 50 ethylene oxide and/or propylene oxide units (more preferably ethoxylated castoroil with 30 to 45 ethylene oxide units), and 45 to 58% by weight of an amide of the formula (I)

$$R^1-C(O)N(R^2)_2 \quad (I)$$

where $R^1$ is $C_5$-$C_{19}$-alkyl and $R^2$ is $C_1$-$C_4$-alkyl, preferably $R^1$ is $C_8$-$C_{10}$-alkyl or $C_{12}$-alkyl and $R^2$ is $C_1$-alkyl, and optionally 1 to 5% by weight of an anionic surfactant, based on the total weight of the emulsifiable concentrate.

The invention furthermore relates to a process for the preparation of the emulsifiable concentrate according to the invention by mixing the triazole fungicide as defined above, the aromatic hydrocarbon as defined above, and the amide of the formula (I) as defined above and optionally an emulsifier.

The invention furthermore relates to an emulsion obtainable (preferably obtained) by mixing the concentrate of the invention with water. The emulsion normally arises spontaneously upon mixing. In most cases, the emulsion is an oil-in-water emulsion. The emulsion contains preferably 0.1 to 10% of concentrate in water, even more preferably 0.5 to 5% of concentrate in water.

The invention furthermore relates to a method for controlling phytopathogenic fungi, where the concentrate according to the invention or the emulsion according to the invention is allowed to act on the phytopathogenic fungi, their environment, on the crop plants to be protected from the phytopathogenic fungi or on the soil. The therapeutic treatment of humans and animals is excluded from the method for controlling phytopathogenic fungi.

When employed in crop protection, the application rates of the triazole fungicides amount to from 0.001 to 2 kg per ha, preferably from 0.005 to 2 kg per ha, especially preferably from 0.05 to 0.9 kg per ha and in particular from 0.1 to 0.75 kg per ha, depending on the nature of the desired effect. In treatment of plant propagation materials such as seeds, e.g. by dusting, coating or drenching seed, amounts of active substance of from 0.1 to 1000 g, preferably from 1 to 1000 g, more preferably from 1 to 100 g and most preferably from 5 to 100 g, per 100 kg of plant propagation material (preferably seed) are generally required. When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizers or micronutrients and further pesticides (for example herbicides, insecticides, fungicides, growth regulators, safeners) may be added to the emulsion in the form of a premix or optionally only shortly before use (tank mix). These agents can be admixed to the compositions according to the invention at a weight ratio of from 1:100 to 100:1, preferably from 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

Advantages of the present invention are, inter alia, that high dissolved triazole fungicide concentrations in the concentrate can be employed; that an emulsion forms spontaneously upon dilution of the concentrate with water; that the concentrate does not require the presence of water; that the concentrate forms a stable emulsion upon dilution with water; that the emulsifiable concentrates show cold storage stability; that adjuvants (such as alcohol alkoxylates) can be included in the concentrate formulations.

The examples which follow illustrate the invention without imposing any limitation.

EXAMPLES

Amide 1: C8/C10 fatty acid dimethylamide
NS1: nonionic surfactant, liquid ethoxylated castor oil, 35 ethylene oxide units
NS2: nonionic surfactant, liquid ethoxylated castor oil, 40 ethylene oxide units
AS: anionic surfactant, alkyl benzene sulfonate, Ca salt
Hydrocarbon 1: Technical mixture of aromatic hydrocarbons, boiling range 235-305° C.

Example 1: Preparation of Emulsifiable Concentrates (EC) and Stability Tests The emulsiable concentrates were prepared by mixing the components as described in Table 1A and 1B. The stability has been assessed at room temperature according to CIPAC method MT 36. Examples according to the invention are EC 1-10. EC C1-C5 represent compositions without hydrocarbon 1.

TABLE 1A

| Composition (all data in wt %) | | | | | | | | | |
|---|---|---|---|---|---|---|---|---|---|
| | EC 1 | EC 2 | EC 3 | EC 4 | EC 5 | EC 6 | EC C1 | EC C2 | EC C3 |
| Tebuconazole | 30.7 | 30.7 | 30.7 | 30.7 | 30.7 | 30.7 | 30.7 | 30.7 | 30.7 |
| Amide 1 | 54.5 | 54.5 | 54.5 | 51.6 | 48.16 | 51.6 | 57.3 | 57.3 | 57.3 |
| Hydrocarbon 1 | 2.8 | 2.8 | 2.8 | 5.73 | 9.17 | 5.73 | — | — | — |
| NS 1 | 12 | — | — | — | — | — | 12 | — | — |
| NS 2 | — | 12 | 10 | 10 | 10 | 12 | — | 12 | 10 |
| AS | — | — | 2 | 2 | 2 | — | — | — | 2 |

TABLE 1B

| Composition (all data in wt %) | | | | | | |
|---|---|---|---|---|---|---|
| | EC 7 | EC 8 | EC 9 | EC 10 | EC C4 | EC C5 |
| Tebuconazole | 33.8 | 33.8 | 35.89 | 35.89 | 33.8 | 35.9 |
| Amide 1 | 48.74 | 45.49 | 46.9 | 43.77 | 54.1 | 52.1 |
| Hydrocarbon 1 | 5.42 | 8.67 | 5.21 | 8.34 | — | — |
| NS 1 | — | — | — | — | — | — |
| NS 2 | 10 | 10 | 10 | 10 | 10 | 10 |
| AS | 2 | 2 | 2 | 2 | 2 | 2 |

Each EC of Table 1A and 1B was diluted in CIPAC water D (5% w/w EC in CIPAC water D). The resulting emulsions were assessed according to their spontaneous emulsification when the concentrate is added to water (known in the art as "blooming"), their initial emulsification (turning the measuring cylinder upside down once, assessment after 30 sec) and their emulsion stability over time. The results are shown in Table 2A for EC 1-EC 6 and EC C1-C3 and Table 2B for EC 7-EC 10 and EC C4-C5.

TABLE 2A

| Emulsion stability test (5% EC in CIPAC water D) | | | | | | | | | |
|---|---|---|---|---|---|---|---|---|---|
| | EC 1 | EC 2 | EC 3 | EC 4 | EC 5 | EC 6 | EC C1 | EC C2 | EC C3 |
| blooming | 1 | 1 | 1 | 1 | 1 | 1 | 1 | 1 | 1 |
| initial emulsification | 1 | 2 | 1 | 1 | 2 | 1 | 2 | 2 | 1 |
| stability after 1 h | stable | stable | stable | stable | stable | stable | stable | stable | stable |
| stability after 2 h | stable | stable | stable | stable | stable | stable | stable | stable | stable |
| stability after 4 h | stable | stable | stable | stable | stable | stable | very unstable | unstable | unstable |
| stability after 24 h | stable | stable | stable | stable | stable | stable | very unstable | very unstable | very unstable |

Cipac D: water hardness 432 ppm (Ca:Mg=4:1)
Blooming, initial emulsification:
  1 means very good; 2 means good
Emulsion stability over time:
  Stable: maximum of 0.5 ml cream
  Unstable: means>0.5 to 1 ml cream or maximum 0.5 ml oil
  Very unstable: means>1 ml cream or >0.5 ml oil

TABLE 2B

Emulsion stability test (5% EC in CIPAC water D)

|  | EC 7 | EC 8 | EC 9 | EC 10 | EC C4 | EC C5 |
|---|---|---|---|---|---|---|
| blooming | 1 | 1 | 1 | 1 | 1 | 1 |
| initial emulsification | 1 | 2 | 2 | 2 | 2 | 2 |
| stability after 1 h | stable | stable | stable | stable | stable | stable |
| stability after 2 h | stable | stable | stable | stable | stable | stable |
| stability after 4 h | stable | stable | stable | stable | stable | stable |
| stability after 24 h | stable | stable | stable | stable | unstable | unstable |

Cipac D: water hardness 432 ppm (Ca:Mg=4:1)
Blooming, initial emulsification:
  1 means very good
  2 means good
Emulsion stability over time:
  Stable: maximum of 0.5 ml cream
  Unstable: means>0.5 to 1 ml cream or maximum 0.5 ml oil
  Very unstable: means>1 ml cream or >0.5 ml oil Example 2: Cold Storage Stability of Emulsifiable Concentrates (EC)

The Emulsifiable Concentrates EC 1-6 as disclosed in Example 1 in Table 1A were stored at −5° C. over 7 days. Their appearance was monitored. The results are shown in Table 3A.

TABLE 3A

Cold storage stability of Emulsifiable Concentrates (EC)

|  | EC 1 | EC 2 | EC 3 | EC 4 | EC 5 | EC 6 |
|---|---|---|---|---|---|---|
| appearance after 7 days at −5° C. | clear, no crystals | clear, no crystals | clear, no crystals | clear, no crystals | clear, no crystals | clear, no crystals |

The Emulsifiable Concentrates EC 7-10 were stored at −5° C. over 7 days. Their appearance was monitored. The results are shown in Table 3B.

TABLE 3B

Cold storage stability of Emulsifiable Concentrates (EC)

|  | EC 7 | EC 8 | EC 9 | EC 10 |
|---|---|---|---|---|
| appearance after 7 days at −5° C. | clear, no crystals | clear, no crystals | clear, no crystals | clear, no crystals |

We claim:

1. An emulsifiable concentrate comprising:
   a triazole fungicide,
   a solvent consisting of an aromatic hydrocarbon mixture,
   an emulsifier, and
   an amide of the formula (I)

$$R^1\text{—C(O)N}(R^2)_2 \qquad (I)$$

wherein $R^1$ is $C_6$-$C_{12}$-alkyl and $R^2$ is methyl; and
   wherein the emulsifiable concentrate comprises at least 25% by weight of the triazole fungicide and the ratio of aromatic hydrocarbon to amide of formula (I) is between 1:20 and 1:5,
   wherein the emulsifiable concentrate does not comprise further solvents.

2. The concentrate according to claim 1, wherein the emulsifier is one of an anionic surfactant, a nonionic surfactant, and a mixture thereof.

3. The concentrate according to claim 1, wherein the concentrate comprises at least 30% by weight of the amide of the formula (I) based on a total weight of the concentrate.

4. The concentrate according to claim 1, wherein the concentrate comprises at least 0.5% by weight of the aromatic hydrocarbon based on a total weight of the concentrate.

5. The concentrate according to claim 1, wherein the aromatic hydrocarbon mixture has a boiling point of at least 140° C.

6. The concentrate according to claim 1, wherein the concentrate comprises from 1 to 20% by weight of the aromatic hydrocarbon mixture, and 30 to 80% by weight of the amide of the formula (I), wherein the amounts of the aromatic hydrocarbon mixture and the amide of the formula (I) add up to a sum of 31 to 95% by weight of the concentrate.

7. The concentrate according to claim 2, wherein the nonionic surfactant is selected from the group consisting of alkoxylates.

8. The concentrate according to claim 1, wherein the triazole fungicide is tebuconazole.

9. The concentrate according to claim 1, wherein the concentrate comprises no more than 3% by weight of water.

10. A process for the preparation of the concentrate according to claim 1, the process comprising mixing the triazole fungicide, the aromatic hydrocarbon mixture, the emulsifier and the amide of the formula (I).

11. An emulsion obtainable by mixing water, a triazole fungicide, an aromatic hydrocarbon mixture, an emulsifier and an amide of the formula (I), as defined in claim 1.

12. A method for controlling phytopathogenic fungi, comprising applying one of the concentrate according to claim 1 and the emulsion according to claim 11 on one of the phytopathogenic fungi, their environment, crop plants to be protected from the phytopathogenic fungi, and soil.

* * * * *